US008533362B2

(12) United States Patent
Alexander

(10) Patent No.: US 8,533,362 B2
(45) Date of Patent: Sep. 10, 2013

(54) METHODS AND APPARATUS RELATED TO AN ADAPTER BETWEEN A PREMISE NETWORK AND AN ADVANCED METERING INFRASTRUCTURE (AMI) NETWORK

(75) Inventor: Roger K. Alexander, Rockville, MD (US)

(73) Assignee: Cooper Technologies Company, Houston, TX (US)

( * ) Notice: Subject to any disclaimer, the term of this patent is extended or adjusted under 35 U.S.C. 154(b) by 229 days.

(21) Appl. No.: 12/849,997

(22) Filed: Aug. 4, 2010

(65) Prior Publication Data

US 2011/0035510 A1 Feb. 10, 2011

Related U.S. Application Data

(60) Provisional application No. 61/232,164, filed on Aug. 7, 2009.

(51) Int. Cl.
*G06F 15/16* (2006.01)
*G01R 21/133* (2006.01)

(52) U.S. Cl.
USPC ............ 709/246; 709/206; 709/224; 705/412

(58) Field of Classification Search
USPC ................ 709/223–225, 246, 217–218, 203; 340/870.02; 705/412
See application file for complete search history.

(56) References Cited

U.S. PATENT DOCUMENTS

| | | | |
|---|---|---|---|
| 8,279,778 B2* | 10/2012 | Shuey | 370/259 |
| 2003/0167178 A1* | 9/2003 | Jarman et al. | 705/1 |
| 2003/0225713 A1* | 12/2003 | Atkinson et al. | 705/412 |
| 2006/0271314 A1* | 11/2006 | Hayes | 702/62 |
| 2007/0063868 A1* | 3/2007 | Borleske | 340/870.03 |
| 2007/0083479 A1* | 4/2007 | Swartz et al. | 705/412 |
| 2007/0139218 A1* | 6/2007 | Bovankovich et al. | 340/870.02 |
| 2008/0074285 A1 | 3/2008 | Guthrie | |
| 2008/0219239 A1* | 9/2008 | Bell et al. | 370/351 |
| 2008/0224892 A1* | 9/2008 | Bogolea et al. | 340/870.3 |
| 2009/0135836 A1* | 5/2009 | Veillette | 370/400 |
| 2009/0153357 A1 | 6/2009 | Bushman et al. | |
| 2009/0235246 A1* | 9/2009 | Seal et al. | 717/173 |
| 2010/0073192 A1* | 3/2010 | Goldfisher et al. | 340/870.02 |
| 2010/0195574 A1* | 8/2010 | Richeson et al. | 370/328 |
| 2010/0328023 A1* | 12/2010 | Thomson | 340/3.1 |

OTHER PUBLICATIONS

PCT International Search Report and Written Opinion for corresponding PCT application PCT/US2010/044556, mailed Oct. 4, 2010 (7 pages).

* cited by examiner

*Primary Examiner* — Joshua Joo
(74) *Attorney, Agent, or Firm* — King & Spalding LLP

(57) ABSTRACT

A system described herein can include a first node within an advanced metering infrastructure (AMI) network. The first node can be configured to be installed within a portion of a meter device. The system can also include an adapter configured to function as a second node within the AMI network. The adapter can be configured to translate a signal defined based on a platform of a premise network into a signal defined based on a platform of the AMI network. The adapter can be configured to be a meter-independent device.

14 Claims, 8 Drawing Sheets

METHODS AND APPARATUS RELATED TO AN ADAPTER BETWEEN A PREMISE NETWORK AND AN ADVANCED METERING INFRASTRUCTURE (AMI) NETWORK

CROSS-REFERENCE TO RELATED APPLICATIONS

This application claims priority to U.S. Provisional Patent Application Ser. No. 61/232,164, filed Aug. 7, 2009, entitled "Methods and Apparatus Related to an Adapter between a Premise Network and an Advanced Metering Infrastructure (AMI) Network," which is hereby incorporated by reference in its entirety.

FIELD OF THE INVENTION

Embodiments relate generally to nodes within an advanced metering infrastructure (AMI) network, and, in particular, to an adapter within an AMI network.

BACKGROUND

An advanced metering infrastructure network can have an architecture configured for automated, two-way communications between utility smart meters and/or associated networks and/or devices of a utility company. An AMI network and/or related systems can be configured to provide utility companies with real-time data about power consumption and/or allow customers to make informed choices about energy usage based on the price at the time of use. The availability of two-way AMI communications also can enable the development of energy services and/or applications based on data exchanges between the utility and/or connected end systems.

AMI systems that are being introduced today, in addition to meter reading and/or advanced metering services, can be configured to enable a deploying entity (e.g., a utility) to interface to energy monitoring and/or management systems within commercial, industrial and/or residential premises. The AMI systems can be configured to interface to premise networks (e.g., home area networks (HANs)) to allow for scheduled and/or real-time provision of energy pricing information, as well as transfer of signals for potential system-wide peak energy management (e.g., curtailment) and/or other system control. As these AMI systems are being deployed, multiple HAN technologies are emerging within the premise environment that can enable networking of energy management and/or control of energy consuming, monitoring, management and/or display devices. The premise communications technologies, wired and/or wireless, can provide the local connectivity of energy systems including distributed generation, vehicular and/or other mobile energy systems, etc. These systems may benefit from access and/or interconnection to the deployed utility AMI network and/or may also enhance the capability of the AMI network by providing additional ways for the utility to manage its energy infrastructure.

From the utility perspective, Zigbee technology, which includes a Smart Energy Profile (SEP) application on the Zigbee® wireless network communications protocol stack, and the powerline-based Homeplug® network, are relatively widely referenced communications standards in the premise network (e.g., HAN) environment. However, HAN technologies such as Z-Wave®, Insteon, and/or others also have wide deployment for use in premise automation applications and/or or are also being relatively widely deployed for home and/or premise energy management. Energy management and/or control applications may be developed for use over other technologies such as WiFi-based HAN technologies. As these premise and HAN technologies continue to be developed and/or are incorporated within electric appliances and/or other premise devices an increasing need to support multiple HAN technologies within a utility's service environment may be realized. Furthermore, as the different HAN technologies evolve a need for the AMI network to interface to and/or interwork with multiple concurrent technologies may also be realized.

Known end-to-end AMI systems have been developed to support a single HAN technology (e.g., a Zigbee technology) to be implemented and deployed in conjunction with a smart meters and/or specific premise end devices. For energy demand management, at least some of these known systems have traditionally included head-end application systems that interface to public and/or private RF (UHF or VHF) networks that are able to directly communicate with load control and/or other deployed demand response devices. More recently, these known systems have been designed to carry demand/response (DR) control signals via AMI systems that then allow the signals to be conveyed to premise and/or HAN devices via an interface to a single selected HAN technology implemented within the smart meter.

Known meter-centric approaches may require inefficient investment in and/or deployment of applicable premise/HAN technology in conjunction with each meter installation. Unfortunately, this may occur even before DR participants (e.g., end-customer participants) are fully known or selected. By coupling the HAN selection to the meter deployment, a system-wide HAN technology may be deployed even where the eventual market take-up may only be a fraction of the utility's customer base, resulting in wasted resources. The further drawback of a smart meter deployment that includes a single premise/HAN technology is that the deployment can undesirably lock the utility into a technology choice during an initial phase of the DR system deployment even as technology choices continue to evolve. This can undesirably limit the utility operator flexibility over time and can also undesirably limit the choices that are available to end-customers that may make premise energy management choices at a later date. Accordingly, methods and apparatus are needed to address the shortfalls of present technology and to provide other new and innovative features.

SUMMARY

The systems and methods described herein attempt to overcome the deficiencies of the conventional systems using a generic interface system between the AMI network and the premise/HAN networks. The generic interface system can be configured to communicate with various types of premise/HAN networks by using a communication protocol that is agnostic to each of the premise networks.

In one embodiment, a system can include a first node within an advanced metering infrastructure (AMI) network. The first node can be configured to be installed within a portion of a meter device. The system can also include an adapter configured to function as a second node within the AMI network. The adapter can be configured to translate a signal defined based on a platform of a premise network into a signal defined based on a platform of the AMI network. The adapter can be configured to be a meter-independent device.

In another embodiment, an apparatus can include an adapter including an AMI network module and a premise network module, the adapter being meter-independent. The adapter can be configured to function as a node within an AMI network via the AMI network module. The premise network module can be configured to handle signaling between a platform of a premise network and a platform of the AMI network.

In yet another embodiment, one or more processor-readable media storing code representing instructions that when executed by one or more processors cause the one or more processors to translate signaling between a platform of a premise network and a platform of an AMI network including information originated by the AMI network control system; define a routing table for AMI routing based on routing information received from a plurality of nodes defining the AMI network; define connectivity with a premise device or plurality of premise devices based on information collected through communications with premise devices; and request, from a meter-associated AMI node from the plurality of AMI nodes, meter information related to a meter device including the node from the plurality of AMI nodes.

Additional features and advantages of an embodiment will be set forth in the description which follows, and in part will be apparent from the description, or may be learned by practice of the invention. The objectives and advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION

Reference will now be made in detail to the preferred embodiments of the present invention, examples of which are illustrated in the accompanying drawings.

As used in this detailed description, the singular forms "a," "an," and "the" include plural referents unless the context clearly dictates otherwise. Thus, for example, the term "a network" is intended to mean a single network or multiple networks. Although reference is made, in some embodiments, to specific technologies such as to HAN networks/technology, the embodiments, can be applied generally to (or implemented using), for example, any type of premise network. Similarly, although reference is made, in some embodiments, to specific protocols, the embodiments, can be applied to (or implemented using) any type of protocol.

One or more portions of the components (e.g., advanced metering infrastructure (AMI) adapters, AMI network modules) described in the embodiments herein can be (or can include) a hardware-based module (e.g., an application-specific integrated circuit (ASIC), a digital signal processor (DSP), a field programmable gate array (FPGA)) and/or a software-based module (e.g., a module of computer code, a set of processor-readable instructions that can be executed at a processor). In some embodiments, one or more of the functions associated with the components can be included in different modules (e.g., different modules than those shown) and/or combined into one or more modules that mayor may not be shown.

Figure 1:
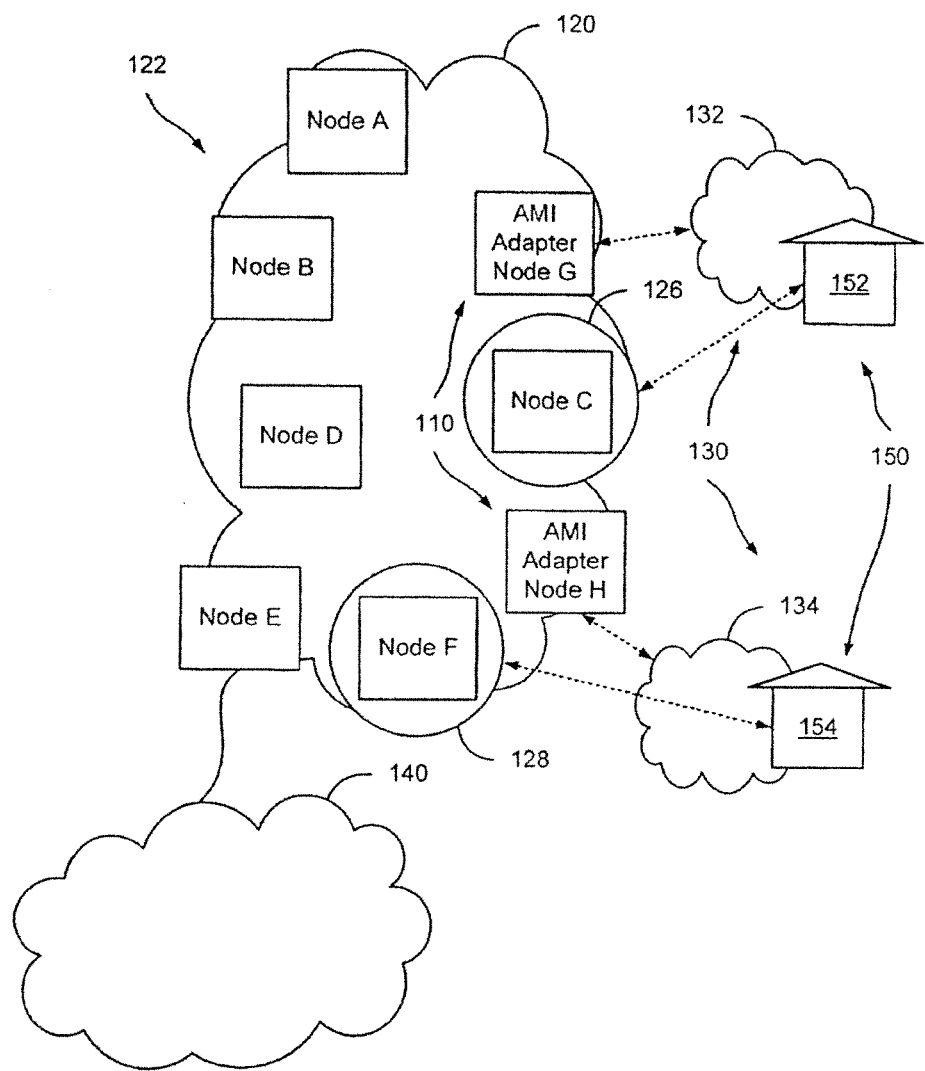
FIG. 1 is a schematic diagram that illustrates nodes within an advanced metering infrastructure (AMI) network configured to communicate with one or more portions of premise networks via AMI adapter nodes, according to an exemplary embodiment.

FIG. 1 is a schematic diagram that illustrates nodes within an AMI network 120 configured to communicate with one or more portions of premise networks 130 via AMI adapter nodes 110, can also be referred to as HAN adapter nodes, according to an embodiment. Nodes that define the AMI network 120 can be configured to communicate with premise network 132 and premise network 134 via AMI adapter node G and AMI adapter node H, respectively. Specifically, the AMI adapters nodes 110 can be configured to facilitate interworking between the AMI network and the premise networks 130, which can be configured to communicate based on the same or different communications technology platforms. In some embodiments, a platform can be based on, for example, a communication protocol related to a particular physical medium and/or a set of applications. In some embodiments, communication can include sending (e.g., transmitting) and/or receiving (e.g., requesting) information, data, packets, and/or signals.

In some embodiments, the premise networks 130 can be associated with physical entities 150, which can be, for example, a residence (e.g., a home), a building, a commercial complex, and so forth. Although not shown, the premise networks 130 can be defined by nodes related to, for example, smart appliances, home security systems, televisions, light systems, telephones, computers, and so forth.

As shown in FIG. 1, the AMI network 120 is defined by node A through node H (which includes AMI adapter node G and AMI adapter node H). In other words, the AMI adapter nodes 110, like nodes A through F, are configured to function as nodes (e.g., source nodes, destination nodes) within AMI network 120. In some embodiments, the nodes A through F can collectively be referred to as nodes 122. In some embodiments, each of the nodes can be independent network entities that have, for example, different network identifiers such as given by unique media access control (MAC) address values. In some embodiments, the nodes 122 can be topological hops within the AMI network 120.

As shown in FIG. 1, node F can be included in a device 128 associated with the physical entity 154. The device 128 can be, for example, a meter device such as an electric meter or a water meter. If the device 128 is an electric meter, the device 128 can be configured to collect information related to electric power usage at the physical entity 154. Similarly node C can be included in a device 126 associated with the physical entity 152. In some embodiments, the node F and/or the node C can be physically coupled to (e.g., physically inside of) the device 128 and/or device 126, respectively. Accordingly, one or more physical components of the node F may not be easily replaced and/or upgraded in a desirable fashion. Although not shown, the other non-adapter AMI nodes (e.g., node B, node E) may also be included in a device.

The nodes 122 can be configured to send (e.g., transmit) information to and/or receive information from devices on and/or in the physical entities 150. For examples, one or more of the nodes 122 that define the AMI network 120 can be configured to collect and transmit information from, for example, physical device 128 associated with physical entity 154. The information can be transmitted via the AMI network 120 to, for example, external network 140. In some embodiments, the AMI network 120 and/or the external network 140 can be associated with (e.g., managed by, owned by, operated by), for example, a public electric utility or other entity.

Nodes A through H can be, for example, configured to self-organize to define AMI network 120 and/or can be configured to self-heal a portion of the AMI network 120 when the AMI network 120 is, for example, disrupted. More details related to nodes and/or functionality of an AMI network are described in U.S. Pat. No. 7,035,207, issued on Apr. 25, 2006, entitled, "System and Method for Forming, Maintaining and Dynamic Reconfigurable Routing in an Ad-Hoc Network"; U.S. Pat. No. 7,346,891, issued Mar. 18, 2008, entitled, "System and Method for Automating Generation of an Automated Sensor Network"; co-pending U.S. patent application Ser. No. 11/656,951, filed Jan. 24, 2007, entitled, "System and Method for Automatically Segmenting and Merging Routing Domains within Networks"; co-pending U.S. patent application Ser. No. 11/600,227, filed Nov. 16, 2006, entitled, "System and Method for Conducting Bi-Directional Communication Sessions with Utility Meters from a Mobile Device"; co-pending U.S. patent application Ser. No. 11/931,443, filed Oct. 31, 2007, entitled, "System and Method for Automating Generation of an Automated Sensor Network"; co-pending U.S. patent application Ser. No. 12/071,834, filed Feb. 27, 2008, entitled, "System and Method for Conducting Bi-Directional Communication Sessions with Utility Meters from a Mobile Device"; all of which are incorporated herein by reference in their entireties.

In some embodiments, the premise networks 130 can be, for example, home area networks (HANs) configured to operate based on one or more platforms. For example, premise network 134 can be configured to communicate based on one or more wired and/or wireless protocols such as, for example, a Z-Wave protocol, a wired and/or wireless internet protocol (IP) (e.g., a WiFi-based IP), a Zigbee (over IEEE 802.15.4) protocol, a Wi-Fi protocol, a proprietary protocol, and so forth. Similarly, the AMI network 120 and/or the external network 140 can be configured to communicate based on one or more wired and/or wireless network protocols. In some embodiments, the platform of the AMI network 120, the premise networks 130, and/or the external network 140 can be based on one or more layers (e.g., layer-3, layer-7) of the open systems interconnection (OSI) model. In some embodiments, the AMI network 120, the premise network 130, and/or the external network 140 can have common layers. For example, the premise network 130 and the AMI network 120 can be configured to communicate based on a common (e.g., a compatible) layer-3 protocol (e.g., IP), but can be configured to function based on different protocol stacks above layer-3.

In some embodiments, the AMI adapter nodes 110 can be configured with specialized modules configured to facilitate communication with a specific type of premise network 130. For example, if premise network 132 is configured to communicate based on a Z-Wave protocol and the AMI network 120 is configured to communicate based on a proprietary network protocol, the AMI adapter node G can be configured to translate signaling between the premise network 132 and the AMI network 120. In other words, the AMI adapter node G can have hardware and/or software specifically configured to translate signaling between the Z-Wave protocol and the proprietary protocol. If premise network 134 is configured to communicate based on a Wi-Fi protocol, the AMI adapter node H can be configured to translate signaling between the premise network 134 (which is based on the Wi-Fi protocol) and the AMI network 120. Accordingly, the hardware and/or software (e.g., hardware and/or software used to translate the signaling) included in the AMI adapter node G and the AMI adapter node H can be different.

As shown in FIG. 1, node F and the AMI adapter node H are both associated with physical entity 154. Specifically, AMI adapter node H is configured to communicate with premise network 134, which is associated with physical entity 154, and node F is included in device 128, which is associated with physical entity 154. Even though AMI adapter node H and node F are associated with physical entity 154, these two nodes of the AMI network 120 are configured to operate independently from one another. For example, node F can be configured to obtain information about the premise network 134 via AMI adapter node H, which is configured to communicate with the premise network 134. Similarly, AMI adapter node H can be configured to, for example, collect meter information related to physical entity 154 via node F, which is included in device 128 (which can be, for example, a meter device). In some embodiments, the AMI adapter node H and node F (which are associated with a common physical entity 154) can be (or may not be) nearest neighbors from a network topology perspective. However, nodes F and node H do not need to be directly connected because they are both present within the AMI network and can communicate through other nodes.

In some embodiments, the AMI adapter node H can be installed within the AMI network 120 specifically to facilitate communication (by translating signals) between node F and the premise network 134. Although not shown, if the platform of the premise network 134 were changed (e.g., upgraded) to a different platform, the AMI adapter node H can be replaced with a different AMI adapter node that can be configured to compatibly communicate based on the different platform. This replacement can be made so that any of the nodes 122 within the AMI network 120, such as node F, can be enabled to communicate with premise network 134. In some embodiments, the AMI adapter nodes 110 can be configured so that various premise network (e.g., HAN) technologies can be supported by a utility operator via the AMI adapter nodes 110 substantially without modification of the AMI network 120 (or related enterprise system) and/or substantially without the need to gain access into, for example, certain devices (e.g., device 126, device 128) after installation of these devices.

In some embodiments, one or more of the AMI adapter nodes 110 can include both a AMI network module (not shown in FIG. 1) and a premise network module (not shown in FIG. 1). Thus, both the AMI network module and the premise network module can be integrated into a single node. The AMI network module can be configured to enable communication within the AMI network 120. Accordingly, the AMI network module can include, for example, an AMI network transceiver (e.g., radio) and/or can be configured to maintain information (e.g., a routing table) for sending/receiving data via the AMI network 120. Similarly, the premise network module can be configured to enable communication within the premise network(s) 130. Accordingly, the premise network module can include, for example, a premise network transceiver (e.g., radio) and/or can be configured to maintain information (e.g., a routing table) for sending/receiving data via the premise network(s) 130. In some embodiments, the non-adapter AMI nodes (e.g., node B, node E) may only include an AMI network module. In some embodiments, the AMI network module and the premise network module can be independent network interface devices that have, for example, different network identifiers (such as, for example, MAC address values). In some embodiments, the AMI network module can be referred to as an AMI communication module. In some embodiments, the premise network module can be referred to as a premise communication module or as a HAN communication module. In some embodiments, one or more of the AMI adapter nodes 110 can include more than one AMI network module and/or more than one premise network module.

In some embodiments, the AMI adapter node H can be configured to translate an instruction (e.g., a message event, an instruction based on a first protocol) originating within the AMI network 120 into an instruction (e.g., a message event, an instruction based on a second protocol) that can be received, interpreted, and processed by (e.g., used by) the premise network 134. Similarly, the AMI adapter node H can be configured to translate an instruction (e.g., a message event, an instruction based on a first protocol) originating within the premise network 134 into an instruction (e.g., a message event, an instruction based on a second protocol) that can be received, interpreted, and processed by (e.g., used by) the AMI network 120.

As shown in FIG. 1, node E can be configured to function as a gateway node between the external network 140 and the AMI network. In some embodiments, for example, meter information collected from the premise network 134 can be transmitted by node F, which can be included in a meter 128 associated with physical entity 154, via the AMI network through gateway E to the external network 140. In some embodiments, the external network 140 can be (or can include), for example, a head-end enterprise network and/or a back-haul network. More details related to gateway nodes are described in at least co-pending U.S. patent application Ser. No. 11/656,951, filed Jan. 24, 2007, entitled, "System and Method for Automatically Segmenting and Merging Routing Domains within Networks," which is incorporated by reference herein in its entirety.

In some embodiments, one or more instructions (e.g., commands) originating at the external network 140 (e.g., originating at a management module of the external network 140) can be communicated to the premise network 134 via the AMI network 120 and the AMI adapter node H. The instructions may not be communicated directly to the premise network 134 because the premise network 134 from the external network 140 because the premise network 134 and the external network 140 may be configured to communicate based on different communications technology platforms. Accordingly, the AMI adapter node H can be configured to translate signaling between the premise network 134 and the external network 140. In some embodiments, the external network 140 can be, for example, an enterprise network configured to support service functionality (e.g., outage notification functionality, customer billing functionality) in addition to, or in lieu of, the pre-paid service functionality shown in FIG. 2. Accordingly, the AMI adapter nodes 110 can be configured to enable and/or to implement portions of the service functionality of the external network 140.

In some embodiments, the AMI network 120, the premise networks 130, and/or the external network 140 can collectively define, for example, an Energy and Demand Management system. The AMI adapter nodes 110 can be configured to support AMI/HAN interoperability while permitting innovation, evolution and diverse product choice in the premise networks 130 (e.g., HANs).

In some embodiments, the AMI network technology described herein can enable controlled access of, for example, specific AMI nodes capable of interfacing to and controlling premise network (e.g., HAN) systems and devices under the direction of a common utility enterprise management and control system operating over the AMI network. In some embodiments, an AMI network can have software and/or hardware configured to adapt to current and future premise (e.g., HAN) technology (wireless or wired) via an AMI (e.g., HAN) Adapter. Thus, the software and/or hardware can be configured to enable various premise network (e.g., HAN) access technologies. In some embodiments, the common AMI network communications (which can be enabled by an adapter) can support downloadable, configurable, software adaptation so that different end devices and/or premise networks can be extended into the AMI network.

In some embodiments, an AMI network can be configured to enable a common utility enterprise energy management and load control system to serve (e.g., concurrently serve) more than one customer independent of the premise network (e.g., HAN) technology deployed by the customer(s). For example, the utility enterprise system can be configured to provide a common interface for a utility operator to perform energy control and load management functions across more than one end-user premise (e.g., HAN) technology.

In some embodiments, an AMI multi-service management and/or control application protocol can be configured to perform two-way messaging, energy management and/or system load control and/or pricing signals to be delivered to a premise device and/or premise network independent of the specific technology used within the premise network (e.g., an end device within a premise network). In some embodiments, this control protocol can be configured to operate between the utility energy management and/or control server and/or a deployed premise AMI adapter node. In some embodiments, the AMI adapter devices can be nodes that effectively extend the AMI network. In some embodiments, the control protocol can be configured to enable decoupling of the enterprise control and/or management system from the application control used by specific premise technologies (e.g., end devices within a premise network).

In some embodiments, an AMI Adapter can have software and/or hardware components that implement an application interface between a demand/response (DR) system control application and/or a premise network (e.g., HAN) technology control application (such as Zigbee smart energy profile or customer IP-based controlled application developed over, for example, a WiFi premise network). In some embodiments, an AMI Adapter element can include, for example, an AMI radio module and/or communication protocol stack that enables the device to operate as a network peer within the AMI network. In some embodiments, the AMI adapter can also include one or more premise technology-specific communications modules that support the control and/or communications with devices within the premise network (e.g., HAN network). With the common AMI communications, the link between the two networks (AMI and premise) can be facilitated by the customized hardware and/or software that is configurable on a per premise technology basis.

In some embodiments, an AMI network configured to concurrently support multiple premise technologies can, over time, provide flexibility for future end-user premise technology choices. This functionality can be enabled through an AMI adapter configured to support different premise technology interfaces.

In some embodiments, an AMI network and/or associated energy management and/or control protocol can be configured so that it does not substantially restrict technology choices in the premise network (can also be referred to as a premise domain). Instead, the AMI network technology disclosed herein can enable connectivity and/or premise interworking models that safeguard, for example, an investment of a utility enterprise while allowing premise technology evolution and/or support for new products coming into the end-user market.

Figure 2:
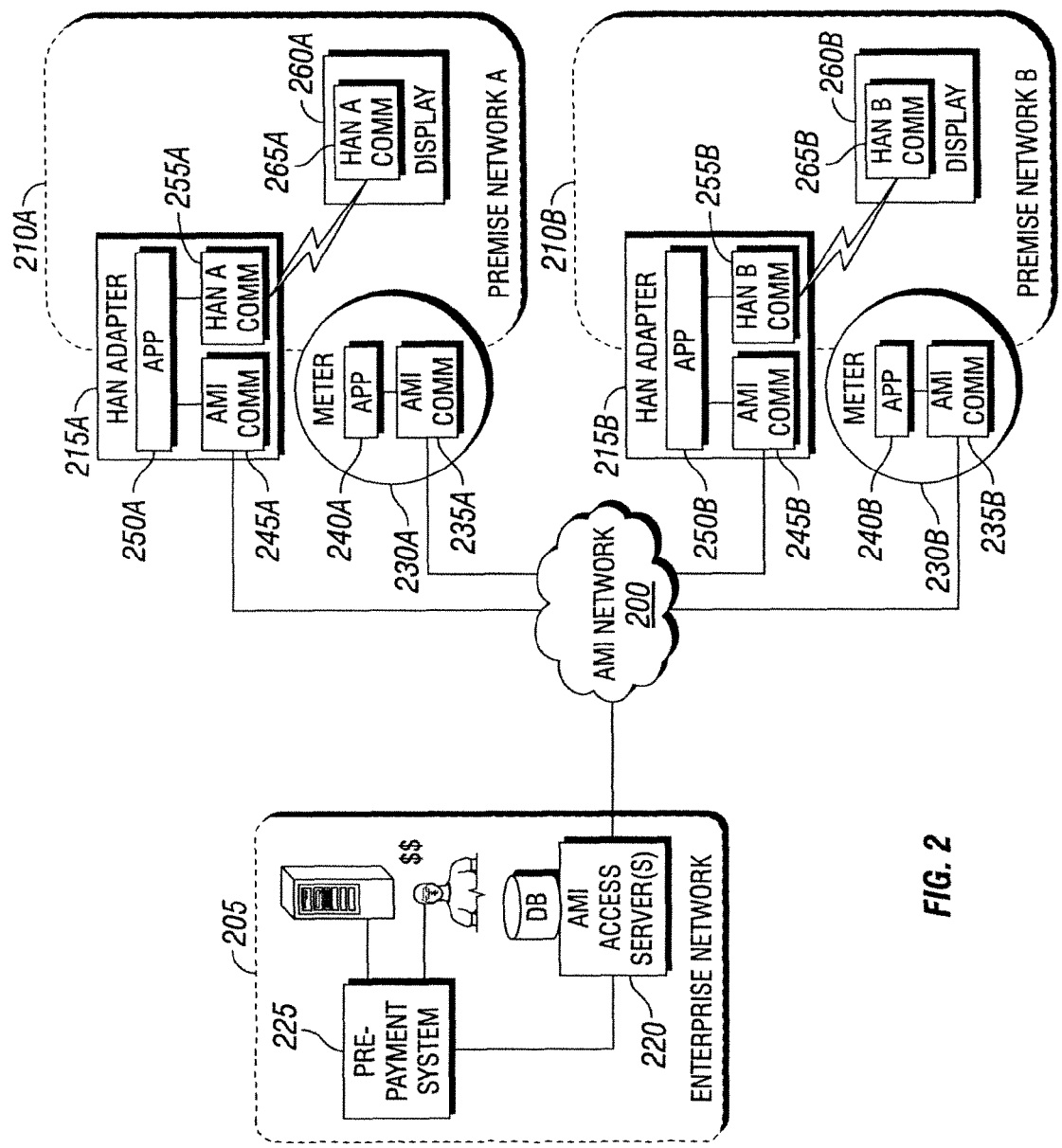
FIG. 2 is a schematic diagram that illustrates components within a meter-independent implementation of a pre-paid electric utility service, according to an exemplary embodiment.

In some embodiments, an AMI adapter can be a meter independent intelligent communicating device that is configured to enable development and/or introduction of new service offerings without the need for access to or changes to, for example, a meter that includes the AMI adapter. Accordingly, the undesirable cost of deploying meters with capacity or functionality that may not be utilized and/or that may not be needed system-wide can be avoided. In some embodiments, an intelligent processing device such as an AMI adapter that is configured to function within a communications network (such as an AMI network) and/or that is capable of, for example, accessing meter data or controlling the meter can be deployed when needed to offer a given service within a premise network (e.g., a premise network of a home) when it is desirable to do so. Specifically, AMI network technology disclosed herein can enable the development and/or introduction of a new service that can be specifically targeted within a region covered by a deployed AMI network (e.g., a legacy AMI network). For example, the AMI network technology disclosed herein can be used within a pre-paid electric service. FIG. 2 is a schematic diagram that illustrates components within a meter-independent implementation of a pre-paid electric utility service, according to an embodiment.

As shown in FIG. 2, a common AMI network 200 and head-end Enterprise Network control system 205 can be configured to concurrently implement application services at a premises across the service network in which two different HAN/premise communications technologies (for example, HAN A 210A and HAN B 210B, as shown) are applied. In some embodiments, a single message broadcast/multicast can convey rate information to more than one of the premise networks independent of the HAN technology. For the particular pre-paid service, that information can be used by devices within premises that implement the service. In some embodiments, a HAN Adapter 215A, 215B can be configured to implement the distributed intelligence to receive and process common broadcast/multicast signals as well as respond to, for example, directed unicast commands associated with an individual customer service.

In some embodiments, the head-end enterprise and/or external pre-payment system can be configured to enable the utility customers to make payments for electricity service. The payment access can occur through various external communications and/or network system interfaces available to the end customers.

In some embodiments, the AMI Access Server 220 shown in FIG. 2 can be configured to provide an interface between a prepayment system 225 and/or the AMI network 200 and/or customer premise network 210A, 210B. In some embodiments, the Access Server 220 can be configured to, for example, control the communications service across a two-way AMI network.

As shown in FIG. 2, a deployed meter 230A, 230B with an AMI communications module 235A, 235B can be associated with each of the premise networks 210A, 210B (e.g., customer networks). In some embodiments, the deployed meter 230A, 230B may not have a capability specific to the provision of pre-paid metering services and/or functionality for other similarly developed meter-independent application service, because the HAN Adapters 215A, 215B can be enabled to handle and/or enable the new functionality. The AMI radio communications (AMI Comm) module 235A, 235B and/or application processor and/or memory (APP) 240A, 240B (shown in the Meters) can be configured to enable AMI network 200 access and/or can be configured to access (e.g., control) the meter 230A, 230B. In some embodiments, the integrated AMI Comm 235A, 235B and/or APP elements 240A, 240B can also be configured to facilitate the reading, storage and/or transmission of meter data to the AMI back-end system 205 across the AMI network 200. In some embodiments, the application processor (APP) 240A, 240B can be also be configured to implement local meter control functions under the direction of command signals provided by the AMI back-end system 205 and/or conveyed via the AMI Access Server 220.

As shown in FIG. 2, the HAN Adapters 215A, 215B, which are meter-independent AMI-HAN access devices, can be deployed to implement the specific customer pre-paid service. As shown in FIG. 2, the HAN Adapters 215A, 215B can include an AMI radio module (AMI Comm) 245A, 245B, an application processor and/or memory module (APP) 250A, 250B, and a HAN radio module (HAN A Comm and HAN B Comm) 255A, 255B, which may be based, for example, on the IEEE 802.11 (WiFi) technology, amongst others. In some embodiments, the application processor and/or memory can be configured with application programs that receive and/or interpret information provided from the back-end pre-payment system and can be configured to take corresponding actions. In some embodiments, the multifunction nature of the application processor together with the available memory can be configured as a platform for the development and/or introduction of unique services independent of the constraints of dedicated hardware processing and memory of the deployed smart meter. In some embodiments, the HAN Adapter 215A, 215B can be configured to provide the communications between the AMI network 200 and the premise (HAN) network 210A, 210B. It can be deployed, for example, for the specific utility service, such as the pre-paid service, when and/or where needed within the coverage of the AMI network 200. In some embodiments, the HAN radio module (HAN A Comm and HAN B Comm) 255A, 255B can be configured to communicate with devices within the premise based on the implemented APP service applications.

In the case of the developed, meter-independent pre-paid service, the HAN Adapters 215A, 215B can be deployed in conjunction with a communicating, in-premise display device 260A, 260B that can provide visual information to, for example, the customer on payments made, electricity consumed, credit remaining, etc. The in-premise display device 260A, 260B has a HAN radio module (HAN A Comm and HAN B Comm) 265A, 265B that can communicate with HAN Comm 255A, 255B of HAN Adapter 215A, 215B. In some embodiments, under the control of the HAN Adapter 215A, 215B, the in-premise display 260A, 260B is also capable of displaying other alarms or notifications associated with the pre-paid meter service. In some embodiments, the HAN Adapters 215A, 215B can also be configured to access and/or control the customer premise meter 230A, 230B via the AMI network 200 as part of deriving usage demand data and/or implementing associated service connect/disconnect functions as part of the pre-paid service.

Figure 3:
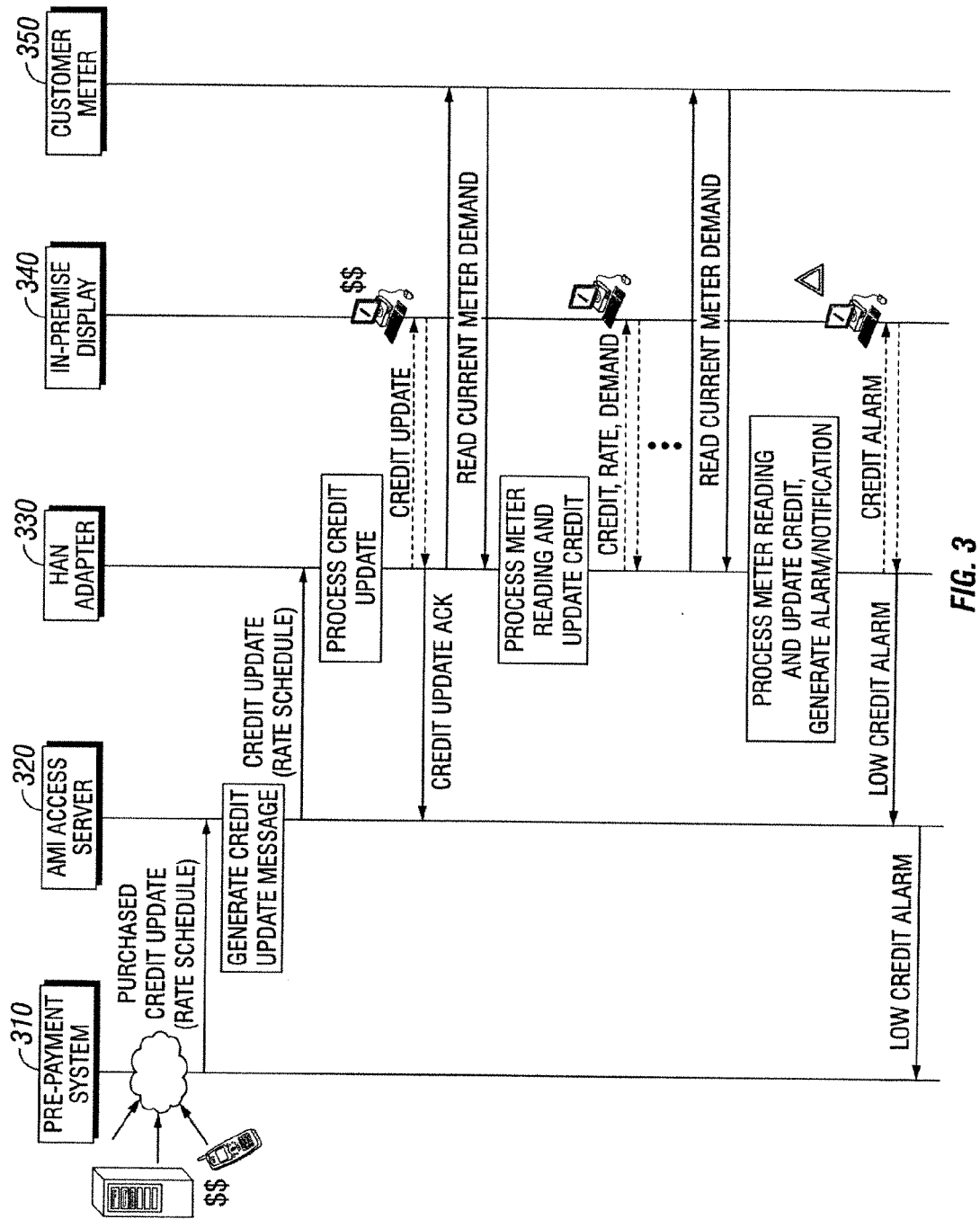
FIG. 3 is a schematic diagram that illustrates signaling exchanges involved in the implementation of a pre-paid service using a standard smart meter, according to an exemplary embodiment.

FIG. 3 is a schematic diagram that illustrates signaling exchanges involved in the implementation of a pre-paid service using a standard smart meter, according to an embodiment. FIG. 3 illustrates the implementation of local and remote service alarms when credit payments associated with a pre-paid service fall below a service-defined threshold. In some embodiments, the standard smart meter can be a smart meter that does not support specific pre-paid meter capabilities. The HAN adapter's processing, memory, and capability to download software offer the potential to expand the service capabilities of an existing AMI network even where meters with limited capabilities have already been deployed.

In some embodiments, through a back-end external system, a customer may make payments for use of the provided electricity service. In some embodiments, those payments may be made using a credit card via cellular phones, online banking systems or other such means external to the utility service provider. In some embodiments, the payment information can be conveyed from the pre-payment system 310 to the utility enterprise AMI access server 320.

In some embodiments, the AMI system can be configured to broadcast utility rate information across the AMI network with that information being received and/or interpreted by each HAN Adapter 330 and conveyed for display on the In-Premise Display 340 according to the requirements of the specific HAN technology associated with each HAN Adapter 330. In the case of the pre-paid service, individual customer usage information can be unicast to the particular end-customer HAN Adapter 330. In some embodiments, the information can be processed by the HAN Adapter APP element (shown as APP elements 240A, 240B in FIG. 2) and credit and/or other account information translated for display according to the requirements of the HAN technology protocol associated with the HAN Adapter 330. Based on the service application processing the HAN Adapter can be configured to periodically read the current meter usage for the associated end customer. In some embodiments, the application protocol between the HAN Adapter 330 and/or the head-end Enterprise Network system can be configured to support the information and/or security parameter exchanges to allow for secure application communications between the HAN Adapter 330 and/or the associated premise smart meter (customer meter 350). In some embodiments, the current meter reading and/or rate information can be used to calculate consumed credit and the updated credit information can be displayed on the in-premise display device 340. In some embodiments, this process can continue according to the application program schedules configurable within the HAN Adapter.

As shown in FIG. 3, when the HAN Adapter 330 processed meter reading and credit deduction indicates that the available customer credit is at a configured threshold level an alarm signal can be generated and/or sent to the in-premise display. In some embodiments, this message can be defined in accordance with the specific premise HAN technology. In some embodiments, the HAN Adapter 330 can also be configured to generate (e.g., produce) an alarm notification signal that can be transferred to the pre-paid system control.

FIG. 3 depicts the following exemplary process, whereby the solid lines show the enterprise system and AMI network signaling while the dashed lines show HAN-specific network signaling. A pre-payment system 310 sends a purchased credit update (rate schedule) to an AMI access server 320. The AMI access server 320 generates a credit update message for transmission to a universal HAN Adapter 330. The HAN Adapter 330 processes the credit update, provides an acknowledgement to the AMI access server 320, and transmits the credit update to an in-premise display 340. The HAN Adapter 330 reads the current meter demand from a customer meter 350, processes the meter reading, and updates the credit, communicating the credit rate and demand with the in-premise display 340.

After reading the current meter demand by the HAN Adapter 330, the HAN Adapter 330 can process the meter reading, update the credit, and if credit is lower than a certain threshold, generate an alarm or notification to send to the in-premise display 340 and the AMI access server 320. The AMI access server 320 transmits this low credit alarm to the pre-payment system 310.

Figure 4:
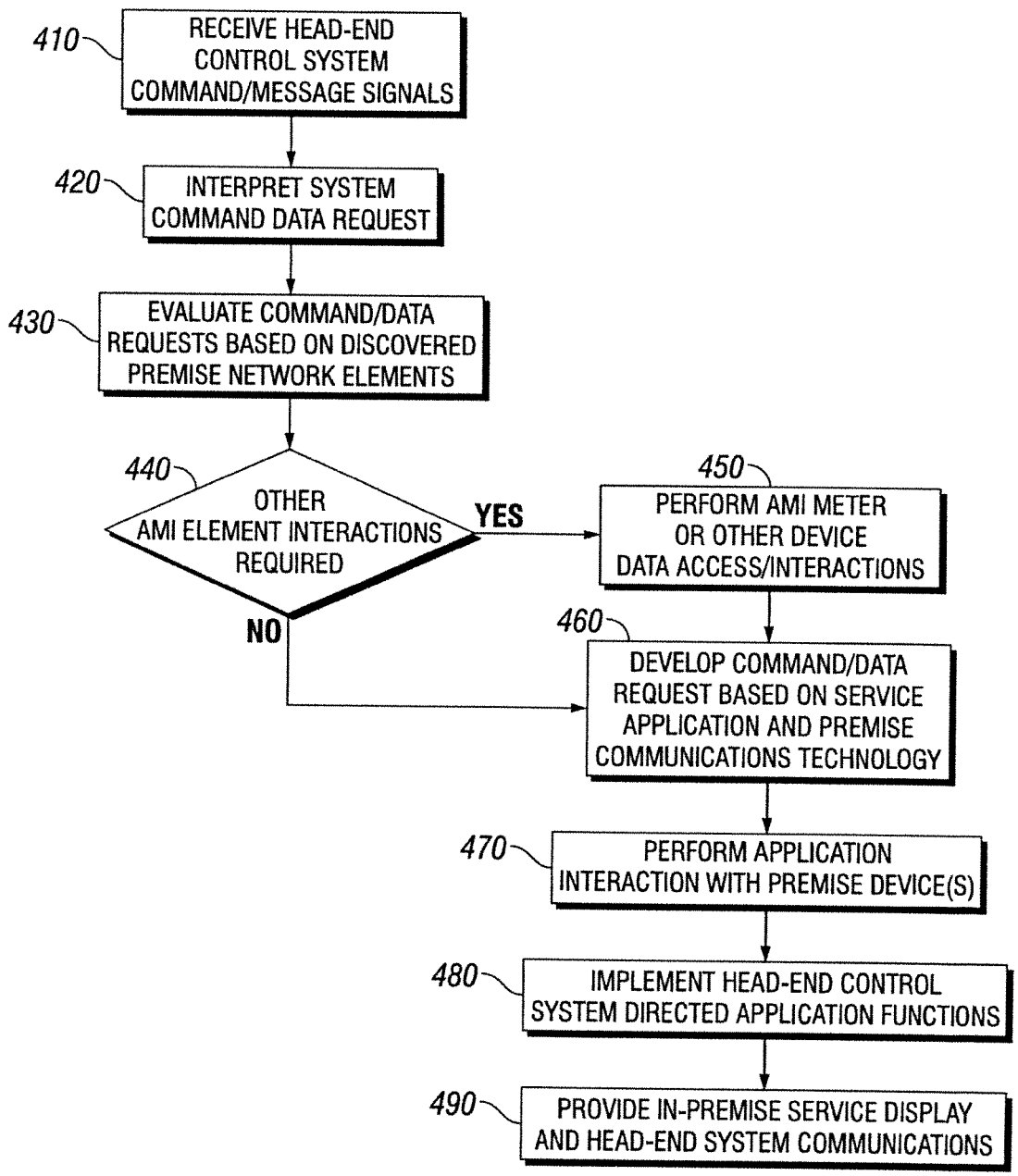
FIG. 4 is a flowchart that illustrates a method for a home area network (HAN) Adapter to implement a pre-paid service, according to an exemplary embodiment.

FIG. 4 is a flowchart that illustrates a method for a HAN Adapter to implement a pre-paid service, according to an embodiment. Specifically, the flowchart is an example that illustrates the type of intelligent application service processing that can take place within the HAN Adapter when implementing the pre-paid service.

In some embodiments, the HAN Adapter's APP can be configured remotely via the AMI network and/or back-end system to support different application processing logic according to the HAN premise technology and/or the service or control that may be implemented for a given utility service. In some embodiments, the application processor can also be configured to control the operation of the individual premise HAN technology communications modules to achieve the necessary pre-paid service processing and/or display functionality In some embodiments, the HAN Adapter can be configured based on a common set of control message signals that can be received and/or interpreted by HAN Adapters that can be configured to individually and/or concurrently manage the different HAN communications hardware and/or generate control signals to devices within different HAN networks.

In block 410, a HAN Adapter can receive head-end control system command/message signals. In block 420, the HAN Adapter can interpret the system command/data request. In block 430, the HAN Adapter can evaluate the command/data requests based on discovered premise network elements. In block 440, it is determined whether other AMI element interactions are required. If other AMI element interactions are required, then, in block 450, the HAN Adapter performs AMI meter or other device data access/interactions. If no other AMI element interactions are required, then the process continues to block 460. In block 460, the HAN Adapter can develop command/data requests based on a service application and premise communications technology. In block 470, the HAN Adapter performs application interaction with premise device(s). In block 480, the HAN Adapter implements head-end control system directed application functions. In block 490, the HAN Adapter provides in-premise service display and head-end system communications.

Although the flowchart shown in FIG. 4 has portions executed in a particular order, in some embodiments, portions of the flowchart can be executed in a different order. In some embodiments, some portions of the flowchart may be omitted and/or other functions that are not shown can be included in the flowchart.

Figure 5:
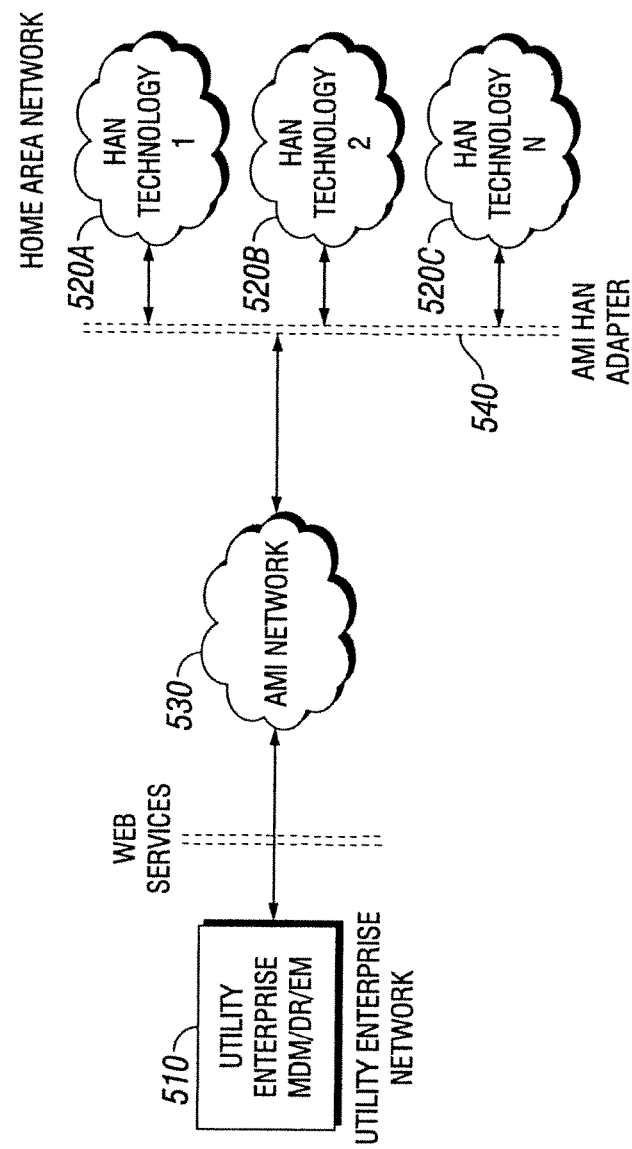
FIG. 5 is a schematic diagram that illustrates a common AMI system configured to concurrently interwork with different HAN technologies, according to an exemplary embodiment.

FIG. 5 is a schematic diagram that illustrates a common AMI system configured to concurrently interwork with different HAN technologies, according to an exemplary embodiment. As shown in FIG. 5, a common enterprise meter data management (MDM), demand response (DR) and energy management (EM) system 510 can be interconnected with distributed energy systems (not shown) and/or premise networks 520A, 520B, 520C via a deployed AMI network 530. In some embodiments, an AMI HAN Adapter 540 can include configurable and upgradeable software to interface to different HAN technology modules (Z-Wave, Zigbee, Insteon, WiFi, etc.) implemented in conjunction with an AMI network radio module.

Figure 6:
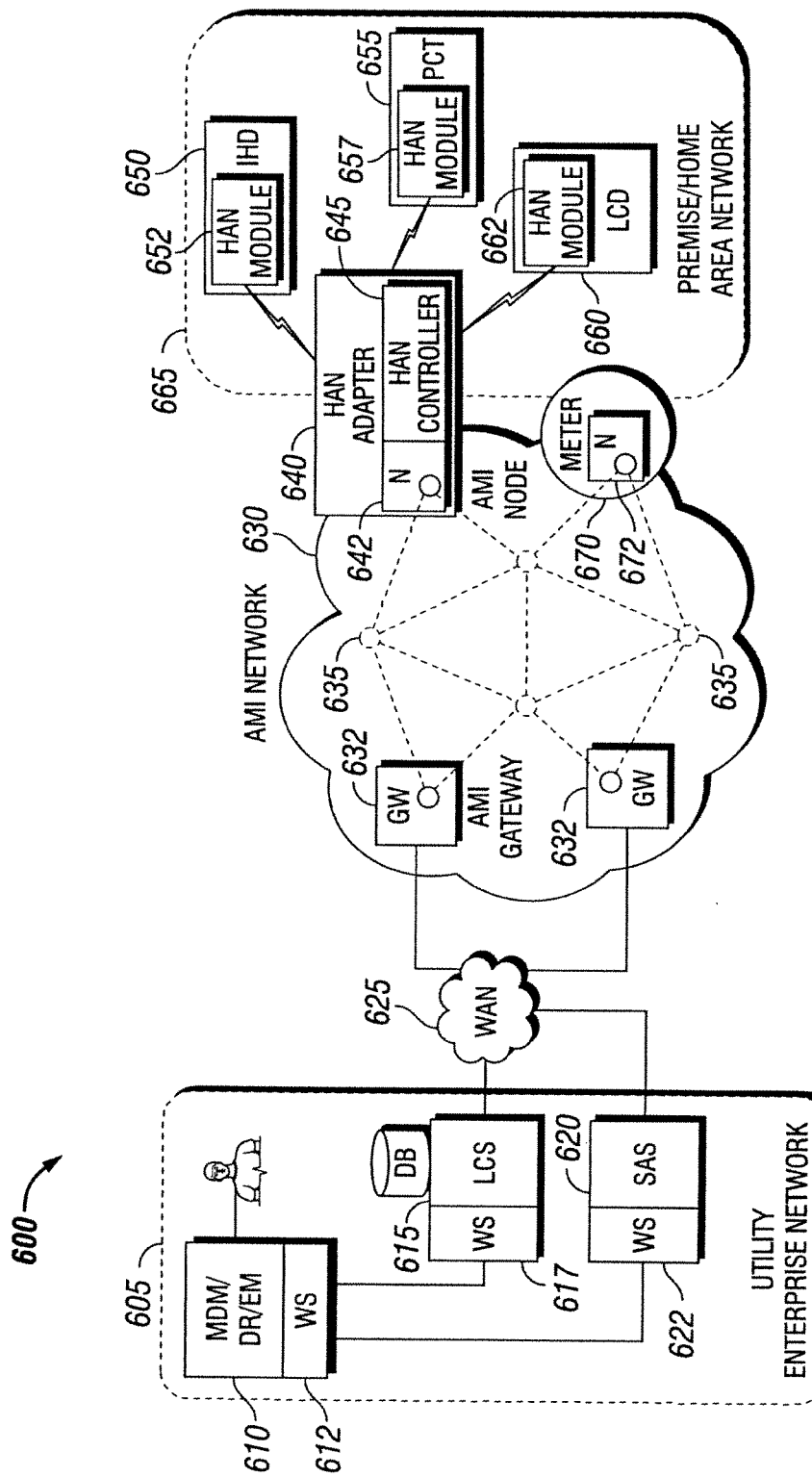
FIG. 6 is a schematic diagram that illustrates a system architecture supporting the interworking between utility common Demand Response/Advanced Metering Infrastructure System and HAN technology deployed in a given end customer premise, according to an exemplary embodiment.

FIG. 6 is a schematic diagram that illustrates a system architecture 600 supporting the interworking between utility common Demand Response/Advanced Metering Infrastructure System and HAN technology deployed in a given end customer premise, according to an exemplary embodiment. A utility enterprise network 605 has an MDM/DR/EM system 610 having a web services (WS) interface 612 for communicating with a load control application server (LCS) 615 via a WS interface 617 and a system access server (SAS) 620 via a WS interface 622.

The LCS 615 and the SAS 620 can communicate with an AMI network 630 via a wide area network (WAN) 625. The AMI network 630 can include one or more AMI gateway devices 632 which can communicate with nodes 635 of the AMI network 630.

A HAN Adapter 640 can communicate as a node 642 and include a HAN controller 645. The HAN controller 645 can communicate with a HAN module 652, 657, 662 of an in home display 650, a programmable communicating thermostat 655, and a load control device 660 of a premise/HAN 665. A meter 670 of the premise/HAN 665 can also communicate as a node 672 of the AMI network 630.

Figure 7:
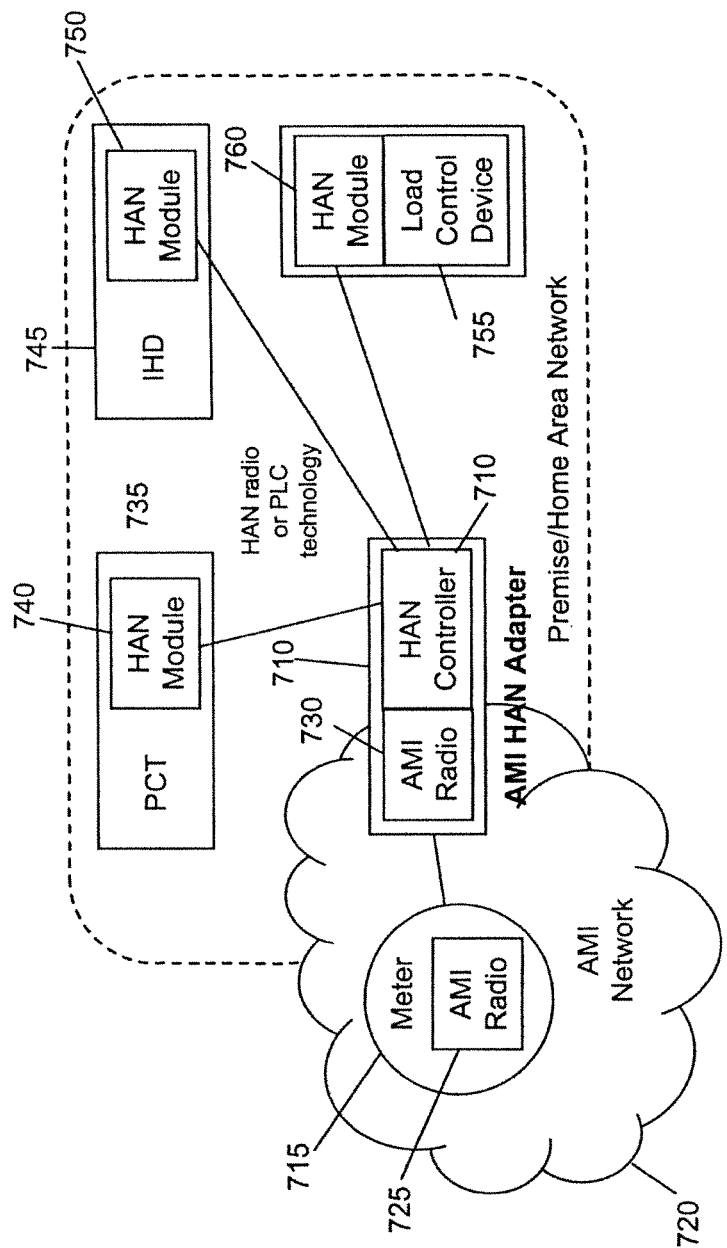
FIG. 7 is a schematic diagram that illustrates connectivity among devices within a single premise under the control of a HAN controller that is specific to a local premise HAN technology implementation, according to an exemplary embodiment.

FIG. 7 is a schematic diagram that illustrates connectivity among devices within a single premise/HAN 705 under the control of a HAN controller 710 that is specific to a local premise HAN technology implementation, according to an exemplary embodiment. As shown in FIG. 7, the AMI HAN Adapter 715 can be configured to support software interfaces that integrate the head-end utility demand response system control (not shown) to the premise HAN radio network and control application. A meter 715 of the premise/HAN 705 on an AMI network 720 having an AMI radio 725 communicates with an AMI radio 730 of the AMI HAN Adapter 715. The HAN controller 710 communicates with a HAN module 740 of a programmable communicating thermostat 735, a HAN module 750 of an in home display 745, and a HAN module 760 of a load control device 755 via HAN radio or PLC technology.

Figure 8:
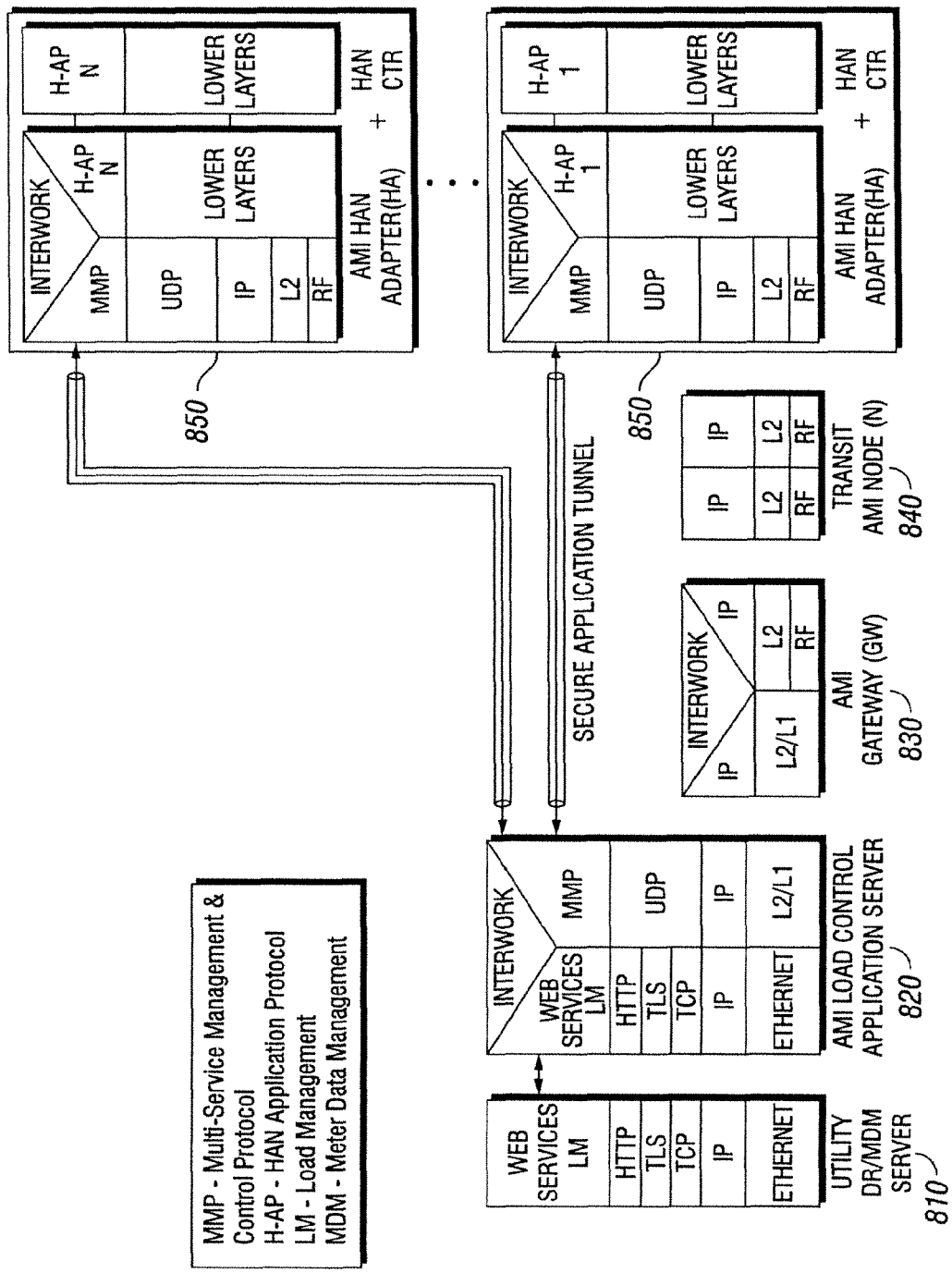
FIG. 8 is a schematic diagram that illustrates an end-to-end communications protocol that can be implemented, according to exemplary embodiment.

FIG. 8 is a schematic diagram that illustrates an end-to-end communications protocol that can be implemented, according to exemplary embodiment. FIG. 8 illustrates how control signals originating within a utility DR/MDM server 810 of a utility enterprise DR system can be securely conveyed to an AMI load control application server 820 and across an AMI network via an AMI gateway 830 and transit AMI node 840 to a HAN Adapter 850 where the software interface within the HAN Adapter translates the service management signals (for example, pricing and/or control signals) to messages specific for the given HAN technology. In some embodiments, the common enterprise application service can be configured to control systems that use different premise/HAN technologies (1, . . . , n), as illustrated. In some embodiments, the Multi-service Management and Control Protocol (MMP) can be configured to facilitate signal transport between the DR system and/or the HAN Adapter AMI radio module. In some embodiments, the illustrated Interwork software element within the Adapter can be configured to provide API intelligence for interworking with different standard and/or customized HAN energy management and/or control applications. In some embodiments, management and/or control of the different HAN technologies can be based on the implemented HAN Application Protocol (H-AP) type. In some embodiments, the MMP protocol can be configured to facilitate the interoperation between a common enterprise control application and/or disparate customer networks implemented using different premise and/or HAN technologies.

In one embodiment, a system can include a first node within an advanced metering infrastructure (AMI) network. The first node can be configured to be installed within a portion of a meter device. The system can also include an adapter configured to function as a second node within the AMI network. The adapter can be configured to translate a signal defined based on a platform of a premise network into a signal defined based on a platform of the AMI network. The adapter can be configured to be a meter-independent device.

In some embodiments, the signal defined based on the platform of the premise network can be a first signal defined based on the platform of the premise network. The signal defined based on the platform of the AMI network can be a first signal defined based on the platform of the AMI network. The adapter can be configured to translate a second signal defined based on the platform of the AMI network into a second signal defined based on the platform of the premise network.

In some embodiments, the adapter can be configured to be disposed outside of the meter device and/or any other home network device. In some embodiments, the adapter can be configured to receive and/or request meter information related to the meter device from the first node. In some embodiments, the adapter can be a nearest neighbor to the first node within the AMI network. In some embodiments, the adapter can be configured to communicate via the AMI network independent of the first node. In some embodiments, the first node can be configured to be a hierarchical peer within the AMI network relative to the adapter.

In some embodiments, the adapter can be a first adapter, and the premise network can be a first premise network. The signal defined based on the platform of the AMI network can be a first signal defined based on the platform of the AMI network. The system can also include a second adapter configured to function as a third node within the AMI network. The second adapter can be configured to translate a signal defined based on a platform of a second premise network into a second signal defined based on the platform of the AMI network. The platform of the first premise network can be incompatible with the platform of the second premise network.

In some embodiments, the AMI network can be a wireless network. In some embodiments, the AMI network can be mutually exclusive from the premise network. In some embodiments, the AMI network can be configured to communicate based on an application layer protocol that is different than an application layer protocol used by the premise network for communication. In some embodiments, the first node can include an AMI network module that has a MAC address value different than a MAC address value of a premise network module included in the adapter. In some embodiments, the premise network can be a home area network (HAN).

In another embodiment, an apparatus can have an adapter including an AMI network module and a premise network module. The adapter can be meter-independent. The adapter can be configured to function as a node within an AMI network via the AMI network module. The premise network module can be configured to handle signaling between a platform of a premise network and a platform of the AMI network.

In some embodiments, the adapter can be configured to function as at least one of a source device or a destination device within the AMI network. In some embodiments, the adapter can include an application module configured to facilitate communication between the AMI network module and the premise network module. In some embodiments, the AMI network module can include a first wireless transceiver portion, and the premise network module can include a second wireless transceiver portion different from the first wireless transceiver portion. In some embodiments, the premise network module can be configured to enable functionality within the premise network as a node of the premise network.

Yet another embodiment can include one or more processor-readable media storing code representing instructions that when executed by one or more processors cause the one or more processors to translate signaling between a platform of a premise network and a platform of an AMI network. The code can cause the one or more processors to define an AMI routing table (e.g., a routing table fix the AMI network) based on routing information received (e.g., received directly, received indirectly) from a plurality of nodes defining the AMI network. The code can cause the one or more processors to request, from a node from the plurality of nodes, meter information related to a meter device including the node from the plurality of nodes.

In some embodiments, the one or more processor-readable media can further store code representing instructions that when executed by the one or more processors cause the one or more processors to perform a calculation related to a pre-paid account. In some embodiments, the one or more processor-readable media further store code representing instructions that when executed by the one or more processors cause the one or more processors to receive account information related to the premise network.

In some embodiments, the one or more processor-readable media further store code representing instructions that when executed by the one or more processors cause the one or more processors to calculate a value based on the account information and the meter information and send the value to a node of the premise network. In some embodiments, at least a portion of the signaling is originated outside of the AMI network and is addressed to the premise network via the AMI network. In some embodiments, at least a portion of the signaling is originated within the AMI network and is addressed to the premise network. In some embodiments, the node is configured to function based on a premise routing table (e.g., a routing table for the premise network).

In some embodiments, an AMI system and devices implemented in accordance with the disclosed system can enable flexible deployment, both in time and/or with respect to communications technology, of premise networks (e.g., home area networks) and/or devices while preserving the common AMI network and/or application management and/or control system operation. In some embodiments, an AMI network system including associated extensible management and/or control application protocol can be configured to enable common enterprise systems to transparently interwork with energy generation, management and/or control applications within different premise networks (e.g., HAN networks) and/or end-user devices.

In some embodiments, a system and/or non-meter AMI devices can be configured to interrogate and/or store information associated with energy generation, management and/or control devices and/or systems in an end-user premise network (e.g., HAN network), and/or reachable via a end-user premise (e.g., HAN) communications technology link, and/or make that information available for remote access or remote storage within the utility enterprise systems, independent of the communications technology utilized in the end-system. In some embodiments, a non-meter device can be configured to provide access to premise networks (e.g., HAN) and/or end-devices while also operating as a fully functional node within the AMI network. In some embodiments, a system can include meter-independent devices configured to introduce customized end-user services by extending an AMI service management and/or control network into customer premise networks and/or devices with substantially no (or little) impact to deployed AMI meters and/or meter-based devices.

In some embodiments, a meter-independent AMI network node element can be individually upgraded, managed and/or controlled, and/or can be deployed in one or more customer premises, and/or can be configured to interface to different premise network (e.g., HAN) technologies. In some embodiments, a meter-independent AMI node device can be configured to provide an extension of a deployed AMI network and/or can be configured to offer additional radio path diversity and connectivity to improve (in a desirable fashion) radio connectivity between a utility AMI network and a premise network (e.g., HAN), and/or an energy device for purpose of two-way data information exchanges and/or control.

In some embodiments, a premise network (e.g., HAN) technology adapter element can be configured to allow an AMI network to be extended for providing concurrent two-way communications access between a common AMI network and/or multiple, different end-user communications network technologies. In some embodiments, a meter-independent device can be configured to allow the introduction and/or operation of different customer premise network (e.g., HAN) technologies while retaining inter-operation with a common deployed AMI network and/or enterprise application systems. In some embodiments, a system and/or non-meter AMI device can be configured to interpret energy management and/or load control signals transmitted across a deployed AMI system and/or generate equivalent management and/or control signals within a premise network (e.g., HAN) independent of the end network communications technology. In some embodiments, a meter-independent intelligent processing device with direct connectivity to the AMI network and/or configured to communicate with an existing customer smart meter can be flexibly deployed by a utility operator to provide customized services to an end-customer premise network using any desired premise communications technology and/or with substantially no (or little) impact and/or modification to an existing utility infrastructure.

Some embodiments described herein relate to a computer storage product with a computer-readable medium (also can be referred to as a processor-readable medium) having instructions or computer code thereon for performing various processor-implemented operations. The media and computer code (also can be referred to as code) may be those designed and constructed for the specific purpose or purposes. Examples of processor-readable media include, but are not limited to: magnetic storage media such as hard disks, compact flash (CF) devices, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as ASICs, Programmable Logic Devices (PLDs), and Read-Only Memory (ROM) and Random Access Memory (RAM) devices.

Examples of computer code include, but are not limited to, micro-code or micro-instructions, machine instructions, such as produced by a compiler, code used to produce a web service, and files containing higher-level instructions that are executed by a processor using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

The steps, methods, processes, and devices described in connection with the implementations disclosed herein, are made with reference to the Figures, in which like numerals represent the same or similar elements. While described in terms of the best mode, it will be appreciated by those skilled in the art that the description is intended to cover alternatives, modifications, and equivalents as may be included within the spirit and scope of the invention as defined by the appended claims and their equivalents as supported by the following disclosure and drawings. Reference throughout this specification to "one implementation," "an implementation," or similar language means that a particular feature, structure, or characteristic described in connection with the implementation is included in at least one implementation of the present invention. Thus, appearances of the phrases "in one implementation," "in an implementation," and similar language throughout this specification may, but do not necessarily, all refer to the same implementation.

The described features, structures, or characteristics of the invention may be combined in any suitable manner in one or more implementations. In the following description, numerous specific details are recited to provide a thorough understanding of implementations of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one implementation of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    receiving, at a first adapter from an advanced metering infrastructure (AMI) network, first account credit data, the first adapter and first account credit data associated with a first premise network, the first account credit data received using an AMI communication protocol;
    converting, at the first adapter, the first account credit data for transmission via a first premise communication protocol and transmitting, from the first adapter to a first premise display device the first account credit data using the first premise communication protocol;
    receiving, at the first adapter from a first meter associated with the first account credit data, first meter demand data;
    processing, at the first adapter, the first account credit data and the first meter demand data;
    identifying, at the first adapter, a first low credit alarm based on the first account credit data falling below a first predetermined threshold after subtracting a first cost based on the first meter demand data;
    transmitting, from the first adapter to the first premise display device, the first low credit alarm using the first premise communication protocol;
    receiving, at a second adapter from the AMI network, second account credit data, the second adapter and second account credit data associated with a second premise network, the second account credit data received using the AMI communication protocol;
    converting, at the second adapter, the second account credit data for transmission via a second premise communication protocol and transmitting, from the second adapter to a second premise display device the second account credit data using the second premise communication protocol, wherein the second premise communication protocol is different than the first premise communication protocol;
    receiving, at the second adapter from a second meter associated with the second account credit data, second meter demand data;
    processing, at the second adapter, the second account credit data and the second meter demand data;
    identifying, at the second adapter, a second low credit alarm based on the second account credit data falling below a second predetermined threshold after subtracting a second cost based on the second meter demand data;

transmitting, from the second adapter to the second premise display device, the second low credit alarm using the second premise communication protocol.

2. The method of claim 1, further comprising the step of: transmitting, from the first adapter to an AMI server via the AMI network, the first low credit alarm using the AMI communication protocol.

3. The method of claim 2, further comprising the step of: transmitting, from the AMI server to a pre-payment system, the first low credit alarm.

4. The method of claim 1, further comprising the step of: transmitting, from the second adapter to an AMI server via the AMI network, the second low credit alarm using the AMI communication protocol.

5. The method of claim 4, further comprising the step of: transmitting, from the AMI sever to a pre-payment system, the second low credit alarm.

6. The method of claim 1, wherein the first adapter receives the first meter data via the AMI network using the AMI communication protocol.

7. The method of claim 1, wherein the second adapter receives the second meter data via the AMI network using the AMI communication protocol.

8. A system comprising:
a first adapter in communication with a first premise display device via a first premise network using a first premise communication protocol;
an advanced metering infrastructure (AMI) network in communication with the first adapter using an AMI communication protocol;
a first meter associated with the first premise network and in communication with the AMI network using the AMI communication protocol, wherein the first adapter is configured to:
receive, from the AMI network using the AMI communication protocol, first account credit data associated with the first premise network,
convert the first account credit data for transmission via the first premise communication protocol and transmit the first account credit data to the first premise display device using the first premise communication protocol,
receive from the first meter first meter demand data,
process the first account credit data and the first meter demand data,
identify a first low credit alarm based on the first account credit data falling below a first predetermined threshold after subtracting a first cost based on the first meter demand data, and
transmit from the first adapter to the first premise display device, the first low credit alarm using the first premise communication protocol;
a second adapter in communication with a second premise display device via a second premise network using a second premise communication protocol that is different from the first premise communication protocol, the second adapter also in communication with the AMI network using the AMI communication protocol; and
a second meter associated with the second premise network and in communication with the AMI network using the AMI communication protocol, wherein the second adapter is configured to:
receive, from the AMI network using the AMI communication protocol, second account credit data associated with the second premise network,
convert the second account credit data for transmission via the second premise communication protocol and transmit the second account credit data to the second premise display device using the second premise communication protocol,
receive from the second meter second meter demand data,
process the second account credit data and the second meter demand data,
identify a second low credit alarm based on the second account credit data falling below a second predetermined threshold after subtracting a second cost based on the second meter demand data, and
transmit from the second adapter to the second premise display device, the second low credit alarm using the second premise communication protocol.

9. The system of claim 8, wherein the first adapter is further configured to:
transmit, to an AMI server via the AMI network, the first low credit alarm using the AMI communication protocol.

10. The system of claim 9, wherein the AMI server transmits the first low credit alarm to a pre-payment system.

11. The system of claim 8, wherein the second adapter is further configured to:
transmit, to an AMI sever via the AMI network, the second low credit alarm using the AMI communication protocol.

12. The system of claim 11, wherein the AMI server transmits the second low credit alarm to a pre-payment system.

13. The system of claim 8, wherein the first adapter receives the first meter data via the AMI network using the AMI communication protocol.

14. The system of claim 8, wherein the second adapter receives the second meter data via the AMI network using the AMI communication protocol.

* * * * *